United States Patent Office 3,542,881
Patented Nov. 24, 1970

3,542,881
CATALYTIC PRODUCTION OF DIMETHYL SULFIDE FROM TRITHIANE
Hans-Dieter Rupp, Erlenbach, Gerhard Meyer, Obernburg, and Helmut Mägerlein, Erlenbach, Germany, assignors to Glanzstoff AG, Wuppertal, Germany
No Drawing. Filed Oct. 18, 1968, Ser. No. 768,890
Claims priority, application Germany, Oct. 27, 1967,
G 51,455
Int. Cl. C07c *149/10*
U.S. Cl. 260—609                        10 Claims

ABSTRACT OF THE DISCLOSURE

Process for the catalytic production of dimethyl sulfide by reacting trithiane with an excess of methanol at about 200 to 400° C., preferably at an elevated pressure and either discontinuously or continuously, in the presence of a small amount of at least one catalytic compound selected from the class of the oxides, isopolyacids, heteropolyacids and ammonium salts of the heteropolyacids of tungsten (VI) and molybdenum (VI).

---

Dimethylsulfide can be produced according to various known processes, for example, by reaction of potassium sulfide with methyl chloride or by heating methyl isothiocyanate with sulfuric acid. Also, the reaction of dimethyl ether with hydrogen sulfide has been previously described.

It is further known that one can produce dimethylsulfide by reaction of trithiane with methanol in a molar ratio of about 1:4 to 1:15 in the presence of strong acids or Friedel-Crafts catalysts, at temperatures of 200–400° C. and preferably under an elevated pressure. Without doubt, outstanding yields are achieved by this process. However, since the reaction mixture has a very strong corrosive effect in the use of substances such as hydrogen chloride as catalysts, especially at higher temperatures and higher pressures, it is necessary to employ apparatus made of a material which is especially resistant to corrosion. Moreover, the water set free during the course of the reaction gradually reduces the effectiveness of the catalyst. Thus, catalysts such as aluminum trichloride and boron trifluoride etherate are decomposed in increasing amounts by the liberated water. Other catalysts such as strong acids are diluted by the water in increasing amounts. This especially leads to difficulties in the continuous operation of the process.

It has now been found, in acordance with the invention, that dimethylsulfide can be produced by the catalytic reaction of trithiane with an excess of methanol at temperatures of about 200–400° C. and preferably at elevated pressure in an especially advantageous and improved manner if one employs as the essential catalyst a small amount of a compound selected from the class consisting of the oxides, isopolyacids or hetero-polyacids or ammonium salts of heteropolyacids of tungsten (VI) or molybdenum (VI), either alone or in admixture with each other.

In an especially preferred embodiment of the invention, the catalyst is present on an inert carrier which is preferably a particulated or finely divided heat- and corrosion-resistant refractory material, such as, for example, aluminum oxide or silicon dioxide. In order to achieve the most favorable yields, the catalyst is used in amounts of about 0.0001 to 0.01 mol percent with reference to the added amounts of trithiane. However, even larger amounts of the catalyst such as 0.02 mol percent can also be employed. The carrier is preferably coated with the appropriate amount of the catalyst, which will correspond to about 0.1 to 10% by weight of the catalyst, calculated as the tungsten or molybdenum metal and taken with reference to the carrier. The reaction is carried out at temperatures of about 200–400° C. and preferably at an elevated pressure as in prior catalytic reactions. The preferred temperature range is from 250–350° C. It is especially advantageous to carry out the process in a continuous manner over the novel catalysts disclosed herein.

When carrying out the process according to the invention, the initial reactants, i.e. trithiane and an excess of methanol, and the catalyst are introduced into a suitable vessel, for example, into an autoclave, and then heated for a few hours. After cooling, the pressure is released whereby carbon dioxide escapes as the primary by-product. The reaction mixture can then be mixed with about the same or a two-fold amount of water and fractionated by distillation at normal pressure. The fraction which goes over at 30–60° C. contains practically the entire amount of dimethylsulfide and some methanol, which can then be easily separated by agitating with water. In a second distillation, which is likewise carried out at normal pressure, the dimethylsulfide is recovered at 36–38° C. in very pure form.

In a continuous working method, the reaction can be carried out for example in a spiral tube or bundle of reaction tubes which already contain the catalyst in the form of a fixed bed, e.g. coated on the inert carrier.

According to the process of the invention, a very pure product is obtained. The yields are excellent since the reaction proceeds practically quantitatively. The catalysts which are employed are very insensitive to the reaction conditions and by-products and exhibit a long catalyst life. For this reason, they can be used directly in repeated batch operations without any further treatment. Because of the stability of the catalysts, the process is especially adapted to a continuous operation.

The greatest advantage of the process according to the invention resides in the fact that with regard to corrosion stability, the materials used in the construction of the reaction vessel do not require such high requirements as is the case when using acid-reacting catalysts, for example in the use of hydrogen chloride as catalyst. The dimethyl sulfide product can be further worked up into other known products, e.g., dimethylsulfoxide, which is known to be especially useful as a solvent among other uses.

The invention is further illustrated by the acompanying examples:

EXAMPLE 1

1.4 kilograms of trithiane, 3.5 liters of methanol and 140 grams of neutral alumina, which is coated with tungsten (VI)-oxide ($WO_3$) corresponding to 10% by weight of tungsten on the carrier, is heated in a 10-liter autoclave at 300° C. and maintained at this temperature for 3 hours. The reaction mixture is thereafter cooled and degassed. Approximately 5 liters of water are aded to the reaction mixture. The reaction mixture is then fractionated at normal pressure. The fraction going over at 30–60° C., which contains practically the entire amount of dimethylsulfide and still about 5% methanol, is agitated with water for the separation of the methanol and once again distilled. Dimethylsulfide distills over at 36–38° C. in an amount of 1.8 kilograms which is equal to 95% of theory.

EXAMPLES 2 AND 3

In the same reaction procedure as described in Example 1, other compounds were used as catalyst. The best results are collected in the following table:

TABLE 1

| Catalyst | Catalyst amount in mol percent | Reaction time, hrs. | Yield in percent |
|---|---|---|---|
| Example No.: | | | |
| 2 — $MoO_3$ | 0.01 | 3.5 | 99.6 |
| 3 — $(NH_4)_3PO_4(MoO_3)_{12}$ | 0.0075 | 5 | 98 |
| 4 — $(NH_4)_2MoO_4$ | 0.01 | 11 | 94 |
| 5 — $H_2WO_4$ | 0.005 | 5 | 78 |

Similar high yields are obtained when using isopolyacids of tungsten (VI) as $H_8W_{12}O_{40}$, the hydrates of polymeric tungsten (VI)-oxide $[(WO_3)_x]$ or the corresponding molybdenum (VI) compounds. Similar may be used the ammonium salts of the acids, iso- and heteropolyacids of tungsten (VI) and molybdenum (VI).

The invention is hereby claimed as follows:

1. In a process for the catalytic production of dimethyl sulfide by reacting trithiane with an excess of methanol at a temperature of about 200 to 400° C., the improvement which comprises carrying out said reaction employing as the essential catalyst a small amount of at least one catalytic compound selected from the class consisting of the oxides, isopolyacids, heteropolyacids and ammonium salts of acids, iso- and hetero-polyacids of tungsten (VI) and molybdenum (VI).

2. A process as claimed in claim 1 wherein said catalytic compound is employed in an amount of about 0.0001 to 0.01 mol percent with reference to the trithiane.

3. A process as claimed in claim 1 wherein the catalytic compound is uniformly distributed on an inert carrier, and the reaction is carried out at a temperature of about 250–350° C.

4. A process as claimed in claim 3 wherein said inert carrier is a substance selected from the group consisting of aluminum oxide and silicon dioxide.

5. A process as claimed in claim 4 wherein said inert carrier is coated with about 0.1 to 10% by weight thereof of said catalytic compound, calculated as tungsten or molybdenum.

6. A process as claimed in claim 1 wherein said reaction is carried out under an elevated pressure.

7. A process as claimed in claim 1 wherein said reaction is carried out continuously over said catalyst.

8. A process as claimed in claim 1 wherein said catalyst is $WO_3$.

9. A process as claimed in claim 1 wherein said catalyst is $MoO_3$.

10. A process as claimed in claim 1 wherein said catalyst is $(NH_4)_3PO_4(MoO_3)_{12}$.

References Cited

FOREIGN PATENTS 1,248,647  3/1967  Germany.

CHARLES B. PARKER, Primary Examiner

D. R. PHILLIPS, Assistant Examiner